United States Patent [19]
Fischer et al.

[11] Patent Number: 5,708,697
[45] Date of Patent: Jan. 13, 1998

[54] COMMUNICATION NETWORK CALL TRAFFIC MANAGER

[75] Inventors: Kenneth J. Fischer, Parker, Colo.; Samuel R. Mullins, Iowa City, Iowa; Randall P. Ethier, Herndon, Va.

[73] Assignee: MCI Communications Corporation, Washington, D.C.

[21] Appl. No.: 672,135

[22] Filed: Jun. 27, 1996

[51] Int. Cl.[6] .................................................. H04M 1/64
[52] U.S. Cl. .......................... 379/67; 379/201; 379/230
[58] Field of Search .................................. 379/67, 88, 89, 379/201, 210, 230, 211, 212, 213, 231

[56] References Cited

U.S. PATENT DOCUMENTS 5,193,110  3/1993  Jones et al. ............................ 379/89
5,499,290  3/1996  Koster .................................. 379/230

OTHER PUBLICATIONS

Kabay et al., "The service node—an advanced IN services element," *BT Technology Journal*, vol. 13, No. 2, Apr. 1995, pp. 64–72.

*Primary Examiner*—Fan Tsang

[57] ABSTRACT

A communication network call traffic management system includes a plurality of special resource devices, at least one telephone switch connected to a telecommunications network, a switch control interface, a plurality of application platforms, a control network, and a call traffic manager. The telephone switch has a plurality of telephone switch ports with each switch port being associated with a special resource device. Each special resource device detects user-selectable information contained in a telephone call. The call traffic manager uses initial call information to allocate a special resource device, control the switch to direct the telephone call to a switch port that is associated with the allocated special resource device, and allocate a first application platform for interacting with the telephone call. At any point during the telephone call, the call traffic manager can interact with the telephone switch and/or the application platform to dynamically reallocate a new special resource device and/or a new application platform necessary to service the call.

16 Claims, 5 Drawing Sheets

COMMUNICATION NETWORK CALL TRAFFIC MANAGER

BACKGROUND OF THE INVENTION

1. Field of the Invention

The present invention relates to a communication network call traffic management system. More particularly, the present invention relates to a telecommunications network call traffic management system for dynamically and efficiently allocating system components that provide intelligent network services.

2. Related Art

Telephone call processing by a conventional intelligent network service system typically involves at least three components: a telephone switch port, an application platform running an application process, and an optional special resource device. The special resource device is used for detecting in-band information, for example, a dual tone multi-frequency (DTMF) detector or a speech recognition device. Typically, there is a one-to-one-to-one association of these three components. This association does not vary dynamically during a telephone call. Thus, the association of the components imposes constraints on the types of services that may be allocated or provisioned for processing a telephone call and does not allow for the most efficient utilization of resources.

A frequently encountered service constraint occurs during a telephone call when an application platform determines that a different kind of special resource device is required for processing the call than that already associated with the process. For example, a DTMF cut-through occurring during an application process, such as when a user enters a DTMF digit, may cause the application platform to determine that a facsimile needs to be stored. In such a situation, it would be desirable for the application platform to transfer the call to a different switch port connected to a special resource device capable of sending a facsimile while still maintaining processing control of the call. However, in conventional systems, because the association of components does not vary, the user must hang up and call the service again, or the application platform must transfer the call to another switch port, another application platform, and another special resource device, all of which are statically associated therewith for providing the requested service. Thus, the original application platform does not retain control of the call.

Another type of service constraint occurs when an application platform determines that it is desirable to leave a call connected to the same switch port and special resource device, but determines that processing control of the call should be passed to another application platform having the required processing capabilities. Conventional systems are unable to provide this capability. Thus, the caller would have to hang up and call a different application platform to receive that particular service, or the call must be routed to a different switch port on a different switch that is associated with a different special resource device to access the other application platform.

In both of these examples, the nature of conventional component mapping is that the association of the system components is determined when a call is initially processed, and the association does not vary during a call, even when further call processing is required.

An example of a conventional intelligent network service system is disclosed in a publication entitled "The service node—an advanced IN services element", by S. Kabay and C. J. Sage, BT Technology Journal, Vol. 13, No. 2, pp. 64–72, April 1995, which is incorporated herein by reference. This particular conventional system includes a service logic execution environment (SLEE) that schedules an application platform to take control of a call when an appropriate trigger is detected. In response to the scheduling, the application platform requests a resource for playing an announcement and receiving DTMF digits. The SLEE then issues a command to the switch having the call to connect the call to the requested resource and issues a command having appropriate parameters to the requested resource for configuring the resource to play a selected announcement and receive digits. Subsequently, when the call is connected to the resource, the SLEE issues a command to the resource to play the selected announcement.

While this conventional intelligent network service system is able to schedule an application platform based on a detected trigger, the system is unable to transfer calls between application platforms, unable to move a call between different switch ports while maintaining control within one application platform, and unable to select a special resource device based on a functional resource request in view of, for example, cost considerations of using a particular special resource for a call and request. Thus, what is needed is a communications network call traffic management system that is capable of dynamically and efficiently allocating system resources during a call to provide intelligent network services.

SUMMARY OF THE INVENTION

The present invention provides a communications network call traffic management system that dynamically allocates and efficiently provisions system components to overcome service constraints. The system of the present invention includes at least one telephone switch having switch ports connected to a telecommunications network. The system also includes special resource devices, a control network, application platforms, and a call traffic manager. The control network, which can be a local or a wide area network, is connected to each of the special resource devices and application platforms and the call traffic manager. Each special resource device is associated with a switch port and detects user-selectable information contained in a call, for example, in-band information such as a DTMF signal or a voice signal.

The call traffic manager receives initial call information contained in a call from the switch over a switch control interface, when the call enters the switch. The call traffic manager then allocates a special resource device to the call and controls the switch to direct the call to a first switch port of the switch. This first switch port is associated with the allocated special resource device. The call traffic manager also allocates a first application platform for interacting with the call.

At some point during the call, the first application platform may request the call traffic manager to dynamically allocate a second application platform for interacting with the call based on the user-selectable information included in the call. In response to the request, the call traffic manager allocates a second application platform for interacting with the call. Preferably, the call traffic manager also responds to any request from the first application platform for allocating a second special resource device to the call and for controlling the switch for directing the call to a second switch port. The second switch port is associated with the allocated second special resource device. The call traffic manager may direct the call to the second switch port either when the second application platform is requested, or any other time at the request of the first application platform. The second switch port can be located at the first switch or at a different switch.

Thus, the call traffic manager can switch the voice portion of a call to a different switching device without having the application platform relinquish control of the call. Similarly, the call traffic manager can transfer control of a call from one application platform to another application platform without moving the voice portion of the call. Thus, the call traffic manager hides the distributed nature of the special resource devices and application platforms from the telephone switch. The system thereby provides a non-traditional service environment with a traditional switching environment.

This non-traditional service environment allows customers to design their own application platforms. The call traffic manager can select that customer's application platform for certain incoming calls. The use of a wide area network as the control network allows the customer's platform to communicate directly with any of the special resource devices on the system. Because the system can share special resource devices, a customer does not have to own its own special resource devices, and the service provider of the system network does not have to dedicate certain special resource devices for the customer's application platform. Thus, the system of the present invention allows a customer to cost effectively own an application platform.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
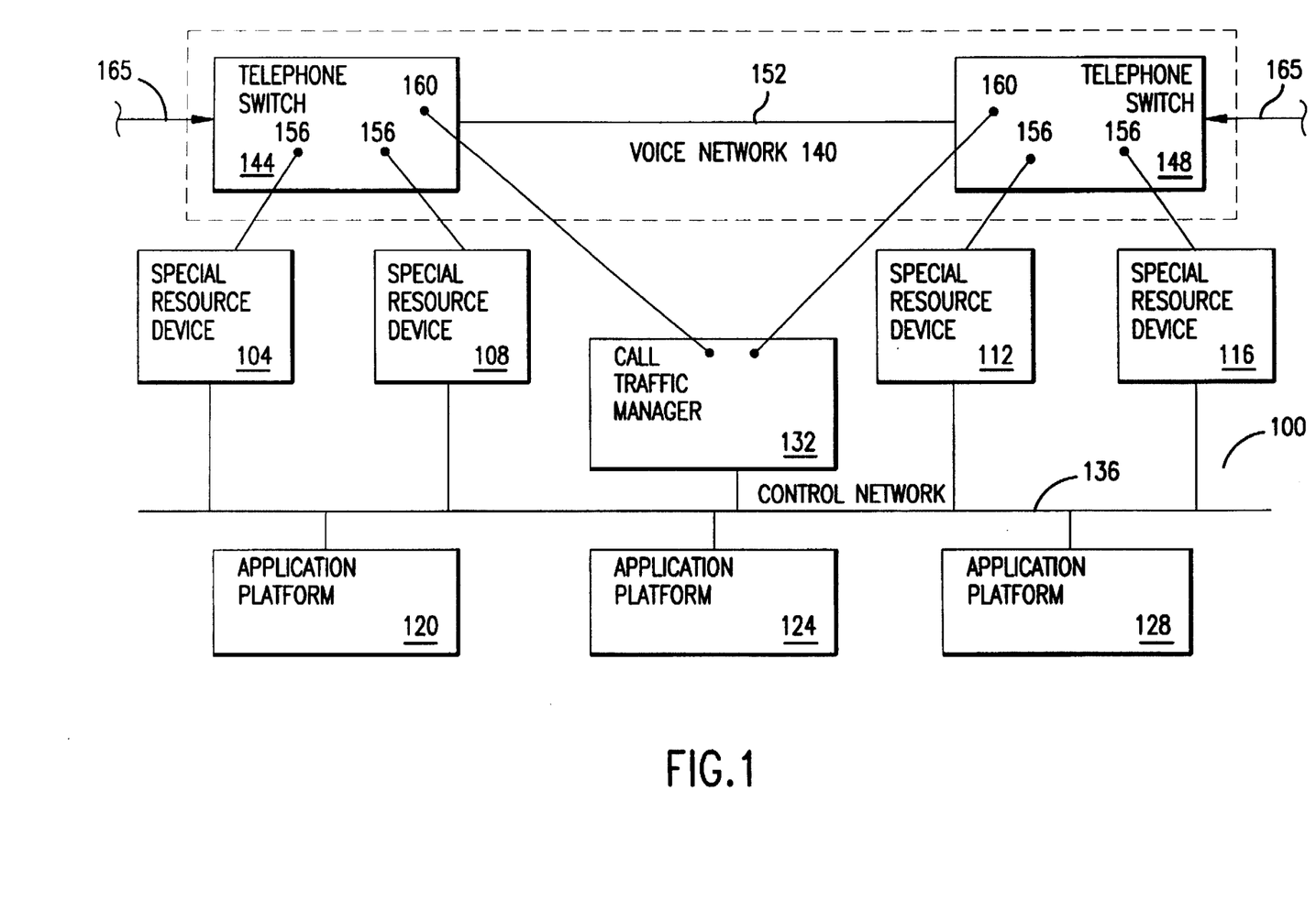
FIG. 1 shows a schematic block diagram of a telecommunications management system according to the present invention.

FIG. 1 shows a schematic block diagram of a telecommunications network call traffic management system 100 according to the present invention that dynamically allocates system components for providing intelligent network-type services. System 100 includes a plurality of special resource devices 104–116, such as DTMF detectors, audio response units (ARUs), facsimile devices, compressed video devices, or speech recognition devices. System 100 further includes a plurality of application platforms 120–128, a call traffic manager 132 and a control network 136. Control network 136 communicatively connects special resource devices 104–116, application platforms 120–128 and call traffic manager 132. Application platforms 120–128 each run an application process, such as a voice mail application or an extension selection routine. Call traffic manager 132 manages call traffic into and through system 100, as described in further detail below with respect to two example call flows shown in FIGS. 2 and 3. Control network 136 can be either a wide area network (WAN), a local area network (LAN), a metropolitan area network (MAN) or a system area network (SAN). While FIG. 1 shows only four special resource devices and only three application platforms, system 100 can have any number of either of these type system components.

When special resource devices 104–116 and application platforms 120–128 are initialized at power up, for example, they each register with call traffic manager 132. Specifically, each component of the system provides information about its network address and its capabilities to call traffic manager 132. Call traffic manager 132 uses this information for determining which system components are available for allocation and for addressing messages to their respective network addresses. Maintenance of connection information, the allocation of the system components and any mid-call reallocation of components is handled by call traffic manager 132.

Figure 4:
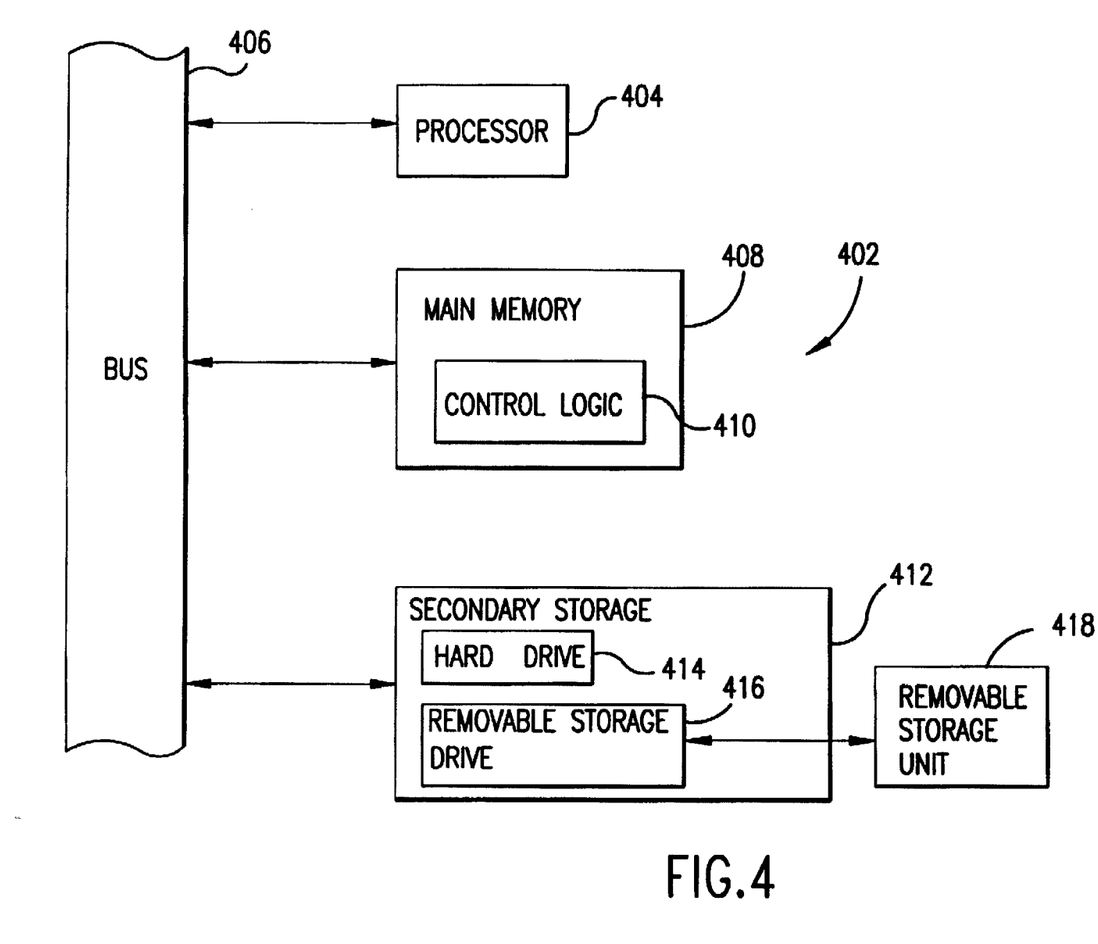
FIG. 4 shows an exemplary computer system for a call traffic manager of the present invention.

In one embodiment, call traffic manager 132 is a computer system operating as discussed herein. An exemplary computer system 402 is shown in FIG. 4. Computer system 402 includes one or more processors, such as processor 404. Processor 404 is connected to a communication bus 406.

Computer system 402 also includes a main memory 408, preferably random access memory (RAM), and a secondary memory 412. Secondary memory 412 includes, for example, a hard disk drive 414 and/or a removable storage drive 416, representing a floppy disk drive, a magnetic tape drive, a compact disk drive, etc. Removable storage drive 416 reads from and/or writes to a removable storage unit 418 in a well known manner.

Removable storage unit 418, also called a program storage device or a computer program product, represents a floppy disk, magnetic tape, compact disk, etc. As will be appreciated, removable storage unit 418 includes a computer usable storage medium having stored therein computer software and/or data.

Computer programs (also called computer control logic 410) are stored in main memory 408 and/or the secondary memory 412. Such computer programs, when executed, enable the computer system 402 to perform the features of the present invention as discussed herein. In particular, the computer programs, when executed, enable the processor 404 to perform the features of call traffic manager 132. Accordingly, such computer programs represent controllers of the computer system 402.

In another embodiment, the computer programs are stored on a computer program product comprising a computer readable medium. The computer programs, when executed by the processor 404, causes the processor 404 to perform the functions of call traffic manager 132 as described herein.

In another embodiment, call traffic manager 132 is implemented primarily in hardware using, for example, a hardware state machine. Implementation of the hardware state machine so as to perform the functions described herein will be apparent to persons skilled in the relevant art(s).

Referring now back to FIG. 1, a telephone voice network 140 is connected to system 100. Telephone voice network 140 includes a plurality of telephone switches, of which only exemplary switches 144 and 148 are shown. Switches 144 and 148 are connected to each other over trunk line 152 using well-known techniques, and receive incoming telephone calls from a public telephone network via a trunk 165. Telephone switches 144 and 148 each include a plurality of switch ports 156. Each special resource device is associated with at least one switch port 156.

Telephone switches 144 and 148 also include a switch control interface 160 for communicatively connecting switches 144 and 148 with call traffic manager 132. Examples of switch control interface 160 include the Switch Computer Applications Interface (SCAI), Integrated Services Digital Network (ISDN), Signaling System 7 (SS7) Transactional Capabilities Application Part (TCAP) or Intelligent Network Application Part (INAP). Traditionally, these types of interfaces provide a means for a switch to communicate with an outboard platform. In the present invention, using these types of interfaces, switches 144 and 148 communicate with call traffic manager 132 as if it were a platform. Other protocols could also be used, as are apparent to one of relevant skill in the art.

Figure 2A:
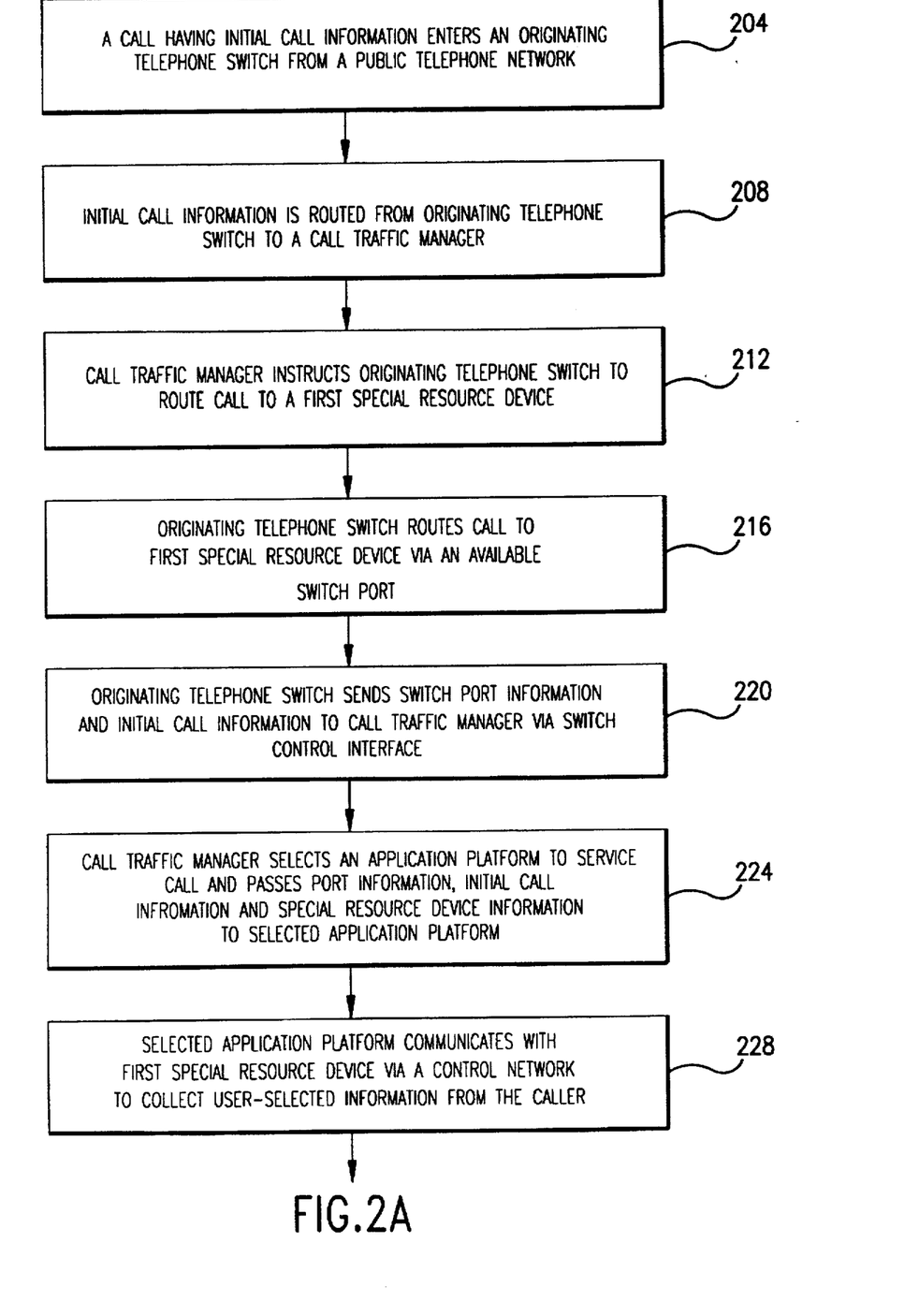
FIG. 2A-2B is a flow chart showing a call flow during a first scenario of the present invention.

Referring now to FIG. 2, a first example call flow for the present invention is shown. In a step 204, a telephone call is routed to one of switches 144 and 148 over a public telephone network, shown by trunk 165. When the telephone call enters voice network 140, the initial call information included in the call is passed from the telephone switch where the call enters voice network 140, for example, switch 144, to call traffic manager 132 via switch control interface 160, as shown in a step 208. Call traffic manager 132 uses the initial call information for deriving the optimal set of system components for processing the call.

For example, call traffic manager 132 may allocate special resource device 108 for processing the call based on the initial call information and based on whether special resource device 108 is available for allocation. Call traffic manager 132 then instructs switch 144 to route the call to special resource device 108 via switch control interface 160, as shown in a step 212. Switch 144 then selects an available switch port 156 and routes the call via switch port 156 to special resource device 108, as shown in a step 216. In a step 220, switch 144 sends switch port information, indicating which switch port has been used to route the call, and initial call information to call traffic manager 132 via switch control interface 160.

Call traffic manager 132 next allocates a particular application platform, for example, application platform 120, for processing the call based on the initial call information and whether platform 120 is available for allocation, as shown in a step 224. Also in step 224, call traffic manager 132 passes the switch port information, initial call information, and special resource device information via control network 136 to selected application platform 120 so that call processing and user interaction can begin. At this point application platform 120 and special resource device 108 can communicate directly with each other via control network 136 to collect user-selected data from the caller, as shown in a step 228. This user-selected data may be either saved in memory in application platform 120 or special resource device 108 for future use and reference, or it may be used to send control signals to application platform 120.

The signaling for the phone call is done either through call traffic manager 132 or with the knowledge of call traffic manager 132, so that call traffic manager 132 can determine when allocated network components are released, that is, made available for processing another call.

At some point during the call, typically based on user-selected input, application platform 120 may determine that a different type of special resource device is required for processing part of the call. In this case, in a step 232, application platform 120 requests call traffic manager 132 to transfer the call to a special resource device having the particular capability required for processing the call further. The request for a different special resource need specify only the functional capability needed and not the particular specific resource device. Call traffic manager 132 selects a special resource device based on the functional capability aspect of the request and an expense consideration for the particular type of call being serviced.

For example, during a call the caller may indicate that he would like to hear the caller prompts in Spanish. Application platform 120 then checks special resource device 108 to see if it includes Spanish language capabilities. In this example, we can assume that special resource device 108 does not have the necessary functionality to service the call. Application platform 120 then sends a request to call traffic manager 132 to allocate a different special resource device having Spanish language capabilities. Because call traffic manager 132 receives information relating to each component at power-up of system 100, call traffic manager 132 can determine, based on the Spanish language requirement sent to it by application platform 120, which special resource device to use. Thus, application platform 120 does not have to request a specific special resource device, for example, special resource device 112. Instead, call traffic manager 132 determines which special resource devices in system 100 have Spanish language capabilities. Call traffic manager 132 then determines which of these special resource devices are available, not already in use, and which of the available special resource devices would be the most cost effective to use.

Figure 2B:
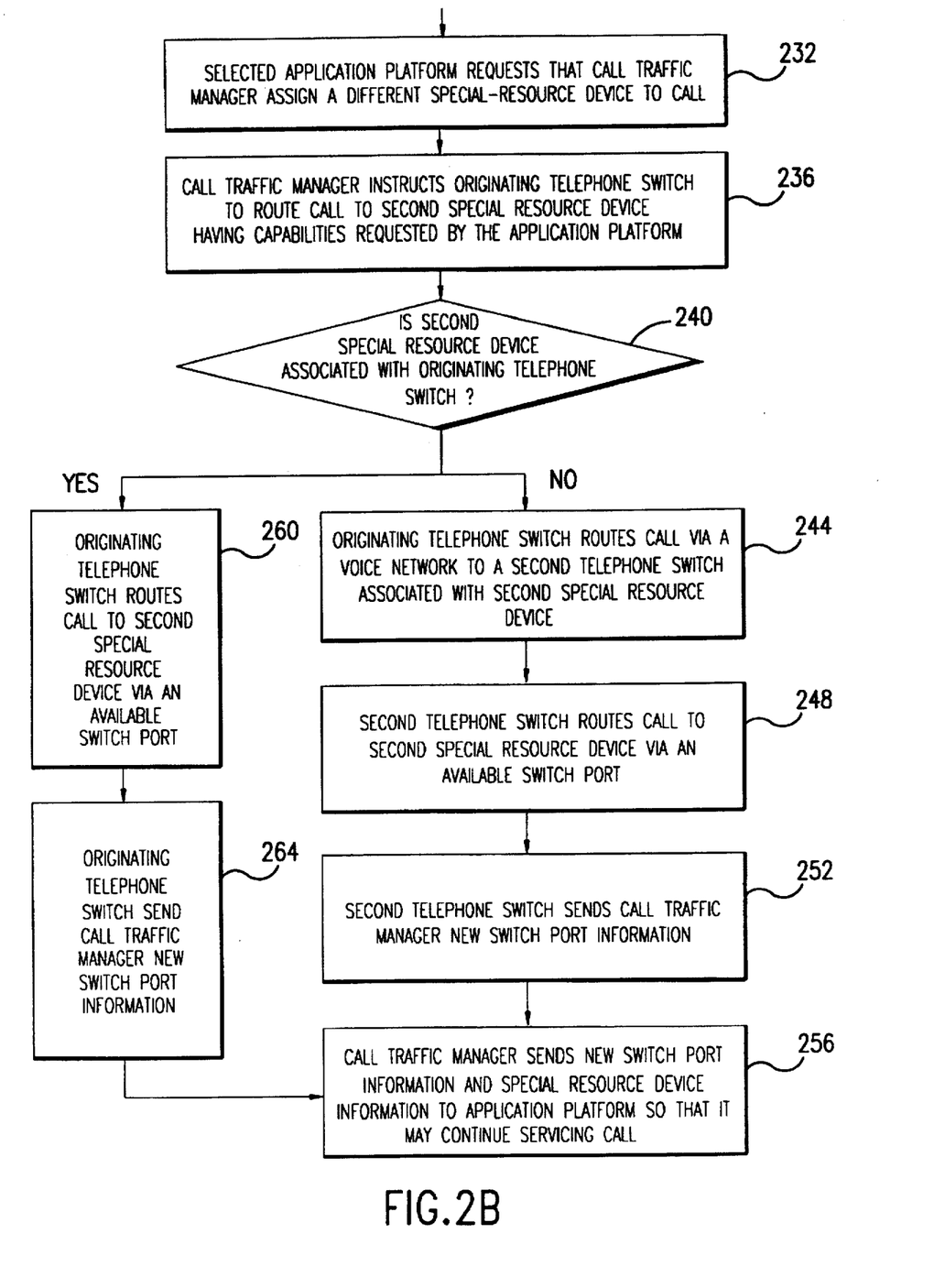

As shown in a step 236, call traffic manager 132 then instructs switch 144 to route the call to the selected, available special resource device having the functional capabilities requested by application platform 120. Switch 144 then determines if the special resource device is associated with it or another switch in a step 240. In one example, call traffic manager reallocates the call to special resource device 104. In this case, the selected special resource device is associated with the originating switch 144. Thus, switch 144 routes the call to special resource device 104 via an available switch port in a step 260. Switch 144 then sends the new switch port information to call traffic manager in a step 264.

In another example, call traffic manager 132 may select a special resource device associated with a switch port that is physically located at a switch different than the originating switch. For example, in system 100 as shown in FIG. 1, call traffic manager 132 selects to reallocate the call from special resource device 108 to special resource device 112. In this case, in a step 244, originating switch 144 routes the call via voice network 140 to new switch 148 which is associated with special resource device 112. Switch 148 then routes the call to special resource device 112 via an available switch port 156, in a step 248. In a step 252, switch 148 sends the switch port information to call traffic manager 132 via switch control interface 160.

When call traffic manager 132 performs this reallocation of components, it informs application platform 120 via control network 136 of the new switch port location of the call so that application platform 120 may provide signaling for the new switch port, in a step 256. Also in step 256, call traffic manager 132 informs application platform 120 of the control network address of the new special resource device so that application platform 120 can issue commands for controlling the new special resource device to continue servicing the call. Depending upon the exact call, special resource device 108 may not be released for reallocation.

Figure 3:
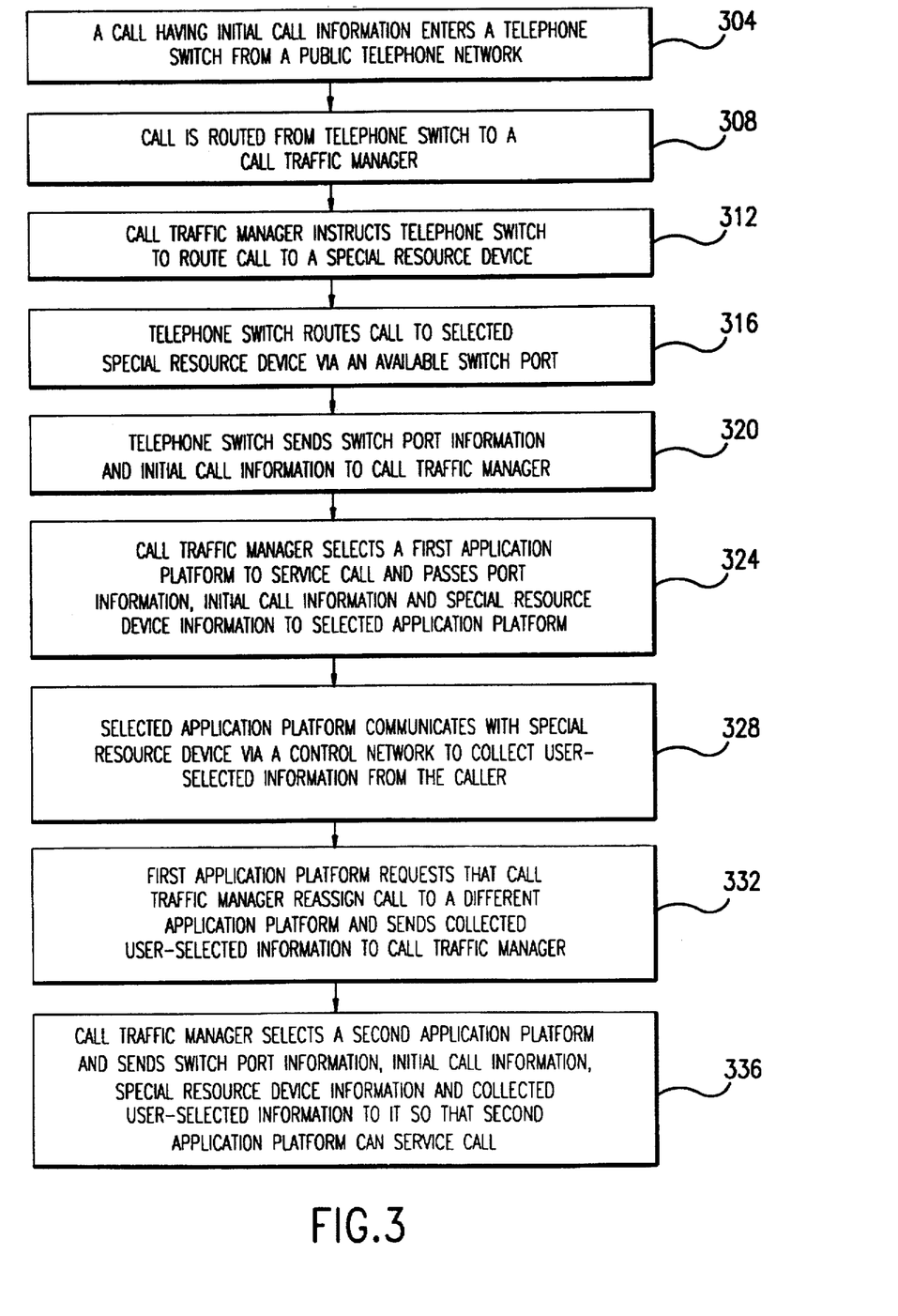
FIG. 3 is a flow chart showing a call flow during a second scenario of the present invention.

In some cases, application platform 120 may determine during a call flow that the call should be transferred to the control of a different application platform having different capabilities while retaining the call on special resource device 108. A call flow for this scenario is shown in FIG. 3. The first steps of this call flow are identical to the call flow shown in FIG. 2. In particular, in a step 304, a telephone call is routed to one of switches 144 and 148 over a public telephone network, shown by a trunk 165. When the telephone call enters voice network 140, the initial call information included in the call is passed from the telephone switch where the call enters voice network 140, for example, switch 144, to call traffic manager 132 via switch control interface 160, as shown in a step 308. Call traffic manager 132 uses the initial call information for deriving the optimal set of system components for processing the call.

For example, call traffic manager 132 may allocate special resource device 108 for processing the call based on the initial call information and based on whether special resource device 108 is available for allocation. Call traffic manager 132 then instructs switch 144 to route the call to special resource device 108 via switch control interface 160, as shown in a step 312. Switch 144 then selects an available switch port 156 and routes the call via switch port 156 to special resource device 108, as shown in a step 316. In a step 320, switch 144 sends switch port information, indicating which switch port has been used to route the call, and initial call information to call traffic manager 132 via switch control interface 160.

Call traffic manager 132 allocates a particular application platform, for example, application platform 120, for processing the call based on the initial call information and whether platform 120 is available for allocation, as shown in a step 324. Also in step 324, call traffic manager 132 may pass the switch port information, initial call information, and special resource device information via control network 136 to selected application platform 120 so that call processing and user interaction can begin. At this point application platform 120 and special resource device 108 can communicate via control network 136 to interact with the caller to collect user-selected data from the caller, as shown in a step 328. This user-selected data may be either saved in memory in application platform 120 or special resource device 108 for future use and reference, or it may be used to send control signals to application platform 120.

In the scenario shown in FIG. 3, application platform 120 requests call traffic manager 132 to allocate a new application platform, in a step 332. Also in step 332, application platform 120 sends to call traffic manager 132 all the user-selected information collected at that stage in the call and stored in application platform 120. In the request, application platform 120 specifies the particular set of capabilities required for processing the call further. Based on its knowledge of all the component capabilities, call traffic manager 132 then allocates an application platform satisfying the request, as shown in a step 336. For example, in system 100 as shown in FIG. 1, call traffic manager 132 may select application platform 124 as the new platform, and acknowledge the request from application platform 120.

Once call traffic manager 132 selects a new application platform, it transfers switch port information, initial call information, special resource device information and user-selected information to the new application platform so that it can service the call. At this point, application platform 120 is removed from the call processing and made available for processing any other calls. Call traffic manager 132 notifies application platform 124 that it has control of the transferred call and begins routing control and/or signaling messages for the call between switch 144 and application platform 124. Call traffic manager 132 also gives control of special resource device 108 to application platform 124.

Call traffic manager 132 of the present invention allows arbitrary association of switch ports, special resource devices and application platform resulting in fewer system components being required for processing calls. It allocates these components at the beginning of a call based on initial call information and availability of the components. It also allows for dynamic reconfiguration of the components during a call such as transferring calls between application platforms, moving a call between different switch ports while maintaining control within one application platform, and the ability to select a special resource device based on a functional aspect of a resource request in view of, for example, an expense consideration for a particular call and request.

While the present invention has been described in connection with the illustrated embodiment, it will be appreciated and understood that modifications may be made without departing from the true spirit and scope of the invention.

What is claimed is:

1. A communication network call traffic management system comprising:

at least one telephone switch connected to a telecommunications network for receiving a telephone call, said switch having a plurality of telephone switch ports, said telephone call including initial call information;

a switch control interface connected to said telephone switch;

a plurality of special resource devices, each of said special resource devices being associated with one of said telephone switch ports of said switch;

a control network connected to each of said special resource devices;

a plurality of application platforms, each of said application platforms connected to said control network so that at least one of said plurality of special resource devices and at least one of said plurality of application platforms communicate directly with each other via said control network; and a call traffic manager connected to said control network and said switch control interface, wherein said call traffic manager receives said initial call information included in said telephone call from said switch via said switch control interface when said telephone call enters said switch, allocates one of said plurality of special resource devices based on said initial call information, controls said switch to direct said telephone call to a first one of said switch ports of said switch, said first switch port being associated with said allocated special resource device, and allocates a first application platform for interacting with said telephone call based on said initial call information, and wherein said call traffic manager is configured to allocate a second application platform for interacting with said telephone call in response to a request from said first application platform to do so.

2. The system according to claim 1, wherein said first application platform requests said call traffic manager to allocate said second application platform based on user-selectable information included in said telephone call.

3. The system according to claim 2, wherein said user-selectable information is detected by said allocated special resource device, and wherein said user-selectable information comprises in-band information.

4. The system according to claim 3, wherein said allocated special resource device is a DTMF detector and said in-band information is a DTMF signal.

5. The system according to claim 3, wherein said allocated special resource device is a speech recognition device and said in-band information is a voice signal.

6. The system according to claim 1, wherein said control network comprises a local area network.

7. The system according to claim 1, wherein said control network comprises a wide area network.

8. The system according to claim 1, wherein said control network comprises a system area network.

9. The system according to claim 1, wherein said control network comprises a metropolitan area network.

10. The system according to claim 1, wherein said first application platform is configured to request said call traffic manager to allocate a second special resource device to interact with said telephone call and said call traffic manager, being responsive to the request from said first application platform, is configured to control said telephone switch to direct said telephone call to a second switch port of said telephone switch, said second switch port being associated with said second special resource device.

11. The system according to claim 10, wherein said second switch port is a part of said telephone switch.

12. The system according to claim 10, where said second switch port is a part of another telephone switch.

13. The system according to claim 10, wherein the first application platform requests the call traffic manager to allocate said second special resource device based on user-selectable information included in the telephone call.

14. The system according to claim 13, wherein said user-selectable information is detected by said first special resource device, and wherein said user-selectable information is in-band information.

15. The system according to claim 14, wherein said first special resource device is a DTMF detector and said in-band information is a DTMF signal.

16. The system according to claim 14, wherein said first special resource device is a speech recognition device and said in-band information is a voice signal.

* * * * *